July 28, 1936.   C. PFANSTIEHL   2,048,708

ELECTRIC METER BEARING

Filed March 2, 1935

Inventor:
Carl Pfanstiehl.
By Dyrenforth, Lee, Chritton and Wilis.
Attys.

Patented July 28, 1936

2,048,708

UNITED STATES PATENT OFFICE 2,048,708

ELECTRIC METER BEARING

Carl Pfanstiehl, Highland Park, Ill., assignor to Pfanstiehl Chemical Company, Waukegan, Ill., a corporation of Illinois Application March 2, 1935, Serial No. 9,070

7 Claims. (Cl. 308—242)

This invention relates to an improved bearing for recording meters such as watt meters and like instruments.

The bearing of a recording watt meter, while carrying a load of only 16-50 grams, owing to its point contact is possibly the most heavy duty bearing now known with the possible exception of the watch escapement mechanism. It is a well known fact that power companies are subjected to enormous losses due to the fact that after short wear electric meter bearings establish friction and fail to record properly. The best meter bearings heretofore produced have been made from high carbon steel, using a sapphire jewel. However, the steel is subject to rusting, even though lubricated, apparently due to extremely local high temperature set up in the bearing. The rust thus formed does not only injure the pivot, but scours the jewel and renders the latter worthless before the pivot is destroyed.

The steel bearings must be lubricated, the lubricant commonly used being paraffin oil, but this lubricant is disadvantageous in that it collects dust.

Moreover, even with the best care in manufacture, the steel pivots are extremely non-uniform in their action, some of them lasting many times as long in service as others. This is true even though a careful final microscopic inspection is made under which 50 to 80% of the steel pivots may be rejected.

By proceeding in accordance with the present invention a meter bearing may be produced which will have many times the life of former bearings, which need not be lubricated, which is non-rusting, non-abrasive, and which will be uniform in life.

Figure 1:
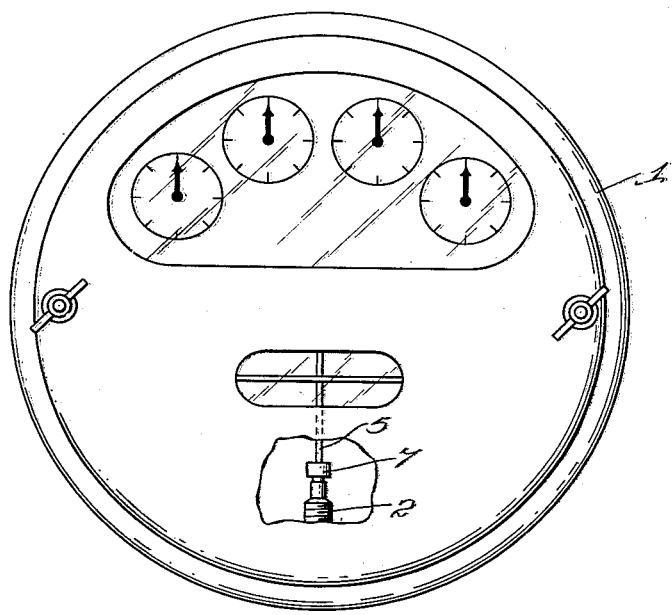
Figure 2:
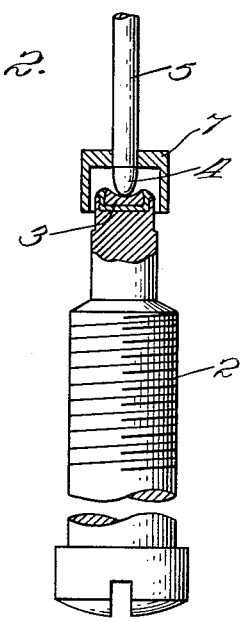
Figure 3:
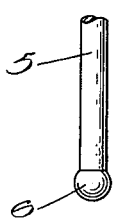
Figure 4:
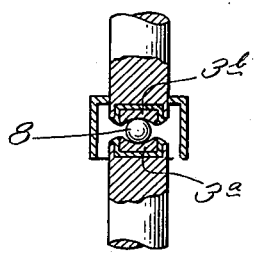

The invention is illustrated in the drawing, in which Fig. 1 illustrates diagrammatically a recording watt meter in front elevation partly broken away to show the bearing; Fig. 2 is an enlarged view of the bearing, in front elevation, partially in section; Fig. 3 is a front elevational view of a pivot before grinding to shape; and Fig. 4 illustrates a front elevation partially in section showing an optional type of bearing in which the pivot is in the form of a ball between two jewels.

In my copending application Ser. No. 753,220, filed November 15, 1934, is described an alloy of tungsten, cobalt, chromium and carbon, preferably in which the carbon exceeds 2.75%, and in which the crystal structure is of the type produced by freezing the molten alloy in less than three seconds. A method of producing the alloy is also described in my copending application Serial Number 753,219, filed November 15, 1934. A preferred range of proportions is:

| | Parts |
|---|---|
| Cobalt | 35–50 |
| Chromium | 30–40 |
| Tungsten | 15–25 |
| Carbon | 3– 5 |

In preparing the alloy, it is of particular importance for meter bearings that all materials be of extreme purity and that oxide coatings be avoided. It is therefore preferred that all fusion of the material be carried out under high vacuum or in an atmosphere of inert gas. At the same time it is preferred that the materials be free from impurities as far as possible. In fluxing the alloy, pure tungsten, in dense form, for example in the form of tungsten rods or discs, such as pure wrought tungsten; pure dense cobalt, such as electrolytic cobalt in the form of little discs, pure dense chromium, such as is electrolytically deposited in small flakes or nodules, are employed. The carbon may be employed in powdered form, and it is preferred to use a pure carbon such as Acheson graphite electrodes.

These materials are mixed and heated and stirred in the absence of oxygen, and the resulting alloy is then rapidly cooled.

It is preferred that freezing be accomplished in three seconds or less. This may be done by cooling in a chilled mold, with the alloy in the form of a slug less than ⅛ inch in thickness. An ingot or slug $\frac{3}{32}$ by 1 by 4 inches is satisfactory.

Improved results may be obtained by freezing the alloy even more rapidly. For this purpose the slug may be broken up into granules, say to pass a 30-mesh screen and to be caught on a 100 mesh screen, divided into small portions, fused and refrozen. The portions should be small enough to spheroid themselves by surface tension when molten, and preferably to form a spheroid of the order of $\frac{1}{16}$th inch in diameter or less. When of this size, the globules will freeze readily in one second or less, under proper cooling conditions.

The spheroid alloy may then be ground to produce a ball-bearing, or it may be welded to a pivot arm, preferably a stainless steel pivot arm. The bearing surface is of course highly polished and substantially spherical. It is preferred that the welding be accomplished in accordance with the method set forth in my copending application Ser. No. 706,565 filed January 13, 1934.

Fig. 1 illustrates a watt meter 1, which is provided with a jewel support 2 carrying a jewel 3 in which rests the alloy-bearing 4 carried on the pivot-arm 5. An enlarged view is shown in Fig. 2, illustrating the cup-shaped form of the jewel 3 and the form of the alloy bearing 4. In Fig. 3 is illustrated a pivot arm 5, to which has been attached a spheroid 6, which later is ground down to the shape shown in Fig. 2. A shield 7 is placed about the pivot arm to prevent dust from reaching the bearing. Fig. 5 shows the jewels 3$^a$ and 3$^b$ between which rests a ball-bearing 8.

The present alloy is so chemically inert that no lubrication is required, although a lubricant may be employed if desired. In spite of its extreme hardness, the alloy does not wear the jewel, which apparently lasts indefinitely.

As an example of the invention, an alloy was prepared in accordance with the following formula:

|  | Per cent |
| --- | --- |
| Cobalt | 46.7 |
| Chromium | 30.8 |
| Tungsten | 19.2 |
| Carbon | 3.3 |

Another preferred form of alloy contains:

|  | Per cent |
| --- | --- |
| Cobalt | 41 |
| Chromium | 35 |
| Tungsten | 20 |
| Carbon | 4 |

Some of the cobalt may be replaced by nickel, and small amounts of various other metals such as molybdenum and zirconium may be added as desired.

When the bearing is welded in the form of a small spheroid to a pivot arm, freezing may be accomplished in about one-half second or less. If the spheroid is maintained in a molten stage for two or three seconds, and is then frozen, a marked change occurs in the crystal structure of the alloy, the size of the crystals decreasing markedly.

The change in the structure, under various cooling times, is quite marked. A slowly cooled alloy shows large, generally dendritic crystals of carbides with segregated masses of matrix. The masses of matrix, however, appear to be crisscrossed by fine hair-like fibres. In this form the large crystals are readily visible to the naked eye.

When cast in a rod $\frac{3}{8}$ inch in diameter the crystals become more broken up, and the areas of background more segregated. The crystals are still extremely large however and the large wide areas of carbides predominate in a photomicrograph.

When cooled in a time of the order of 3 seconds, the crystal structure has entirely changed and the masses of crystals have disappeared, and the alloy when etched and photomicrographed at 160 diameters shows a mass of small crystals, interspersed with a few relatively large needle-like crystals, and with the matrix thoroughly dispersed. Many of the crystals appear to be hexagonal at this stage.

When the alloy is cooled in a time of the order of one second, for example in a ball between .060 and .065 inches in diameter much more matrix appears, and there is relatively less of the carbide, apparently due to super-saturation in solid solution in the matrix. The crystals of carbide are long and fibrous, and their arrangement suggests a mass of matted asbestos. In some instances they will arrange to resemble a herring-bone weave in cloth, or even long spirals resembling shavings. Apparently the larger crystals are partially redissolved.

When a small spheroid is welded to a pivot bearing, a further drastic change in crystal structure results, and the alloy more closely resembles an ordinary alloy. When fused and cooled immediately, some large, long, thin crystals of carbide still remain, but on the whole the alloy has a mottled appearance.

If, however, the bearing is held fused for 2 or 3 seconds and is then cooled, the size of all of the crystals is cut down enormously, and the alloy resembles greatly the ordinary "Stellite" in crystal structure. The alloy is, however, physically and chemically far different from "Stellite", apparently due to the fact that the matrix contains much more carbides, which are in supersaturated solution therein. However the crystals are smaller and more segregated. The structure resembles greatly a picture of the "Milky Way".

The ground or matrix appears to be essentially cobalt, containing in it dissolved or possibly combined carbides. The carbides are relatively insoluble therein, so that in alloys of this type very large proportions are segregated crystals of carbide. The crystal structure is not only altered radically by differences in the cooling rate but at the same time the matrix is apparently supersaturated with carbides by a rapid cooling. The result is that the matrix becomes more chemically resistant.

This supersaturation is of value not only to the high carbon tungsten-chromium-cobalt alloys but also to alloys of the "Stellite" type. "Stellite" in its ordinary form has been found to be unsatisfactory for use as a meter bearing.

The new bearing may be used with sapphire jewels of the ordinary type. It may also be used with a jewel prepared from the alloy itself.

The foregoing description is given for clearness of understanding only, and no unnecessary limitations should be understood therefrom, but the appended claims should be construed as broadly as permissible in view of the prior art.

What I claim as new and desire to secure by Letters Patent is:

1. A meter pivot comprising a metallic arm having welded thereto a rounded bearing surface comprising an alloy of the approximate composition cobalt 35 to 50 parts, chromium 30 to 40 parts, tungsten 15 to 25 parts and carbon 3 to 5 parts, said alloy having the internal structure produced by heating alloy material in quantity to produce a spheroid by surface tension, and freezing the resulting spheroid in a time of the order of one second or less.

2. A meter pivot as set forth in claim 1 in which the alloy is substantially oxide free.

3. A meter pivot as set forth in claim 1 in which the arm is of stainless steel.

4. A meter pivot having a highly polished substantially spherical bearing surface, said surface being of any alloy having the approximate composition of cobalt 35 to 50 parts, chromium 30 to 40 parts, tungsten 15 to 25 parts, and carbon 3 to 5 parts, said alloy having the internal structure produced by heating alloy material in quantity to produce a spheroid by surface tension, and freezing the resulting spheroid in a time of the order of one second or less.

5. A meter pivot as set forth in claim 4 in which the pivot is a ball bearing.

6. A meter pivot as set forth in claim 4 in which the alloy has the approximate composition of cobalt 41, chromium 35, tungsten 20 and carbon 4 parts.

7. A meter pivot as set forth in claim 4 in which the alloy has the approximate composition of cobalt 46.7, chromium 30.8, tungsten 19.2, and carbon 3.3 parts.

CARL PFANSTIEHL.